(12) United States Patent
Son et al.

(10) Patent No.: US 9,136,930 B2
(45) Date of Patent: Sep. 15, 2015

(54) METHOD AND DEVICE FOR FEEDING BACK CHANNEL INFORMATION IN WIRELESS COMMUNICATION SYSTEM SUPPORTING MULTI-INPUT MULTI-OUTPUT SCHEME

(71) Applicant: LG ELECTRONICS INC., Seoul (KR)

(72) Inventors: Hyukmin Son, Anyang-si (KR); Jinmin Kim, Anyang-si (KR); Jaehoon Chung, Anyang-si (KR); Sunam Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/414,664

(22) PCT Filed: Nov. 14, 2012

(86) PCT No.: PCT/KR2012/009588
§ 371 (c)(1),
(2) Date: Jan. 13, 2015

(87) PCT Pub. No.: WO2014/014167
PCT Pub. Date: Jan. 23, 2014

(65) Prior Publication Data
US 2015/0207555 A1   Jul. 23, 2015

Related U.S. Application Data

(60) Provisional application No. 61/671,799, filed on Jul. 16, 2012.

(51) Int. Cl.
| | |
|---|---|
| *H04L 1/02* | (2006.01) |
| *H04L 27/28* | (2006.01) |
| *H04B 7/06* | (2006.01) |
| *H04B 7/04* | (2006.01) |

(52) U.S. Cl.
CPC ............ *H04B 7/0626* (2013.01); *H04B 7/0413* (2013.01)

(58) Field of Classification Search
CPC ....... H04L 1/0618; H04L 1/06; H04B 7/0417
USPC ................. 375/267, 130, 260, 340, 347, 349; 342/268, 377
See application file for complete search history.

(56) References Cited

U.S. PATENT DOCUMENTS

| 8,184,052 B1 * | 5/2012 | Wu et al. ........................ 342/368 |
| 2009/0067539 A1 * | 3/2009 | Maltsev et al. ............... 375/296 |

(Continued)

FOREIGN PATENT DOCUMENTS

KR   10-2009-0095275   9/2009

OTHER PUBLICATIONS

PCT International Application No. PCT/KR2012/009588, Written Opinion of the International Searching Authority dated Mar. 20, 2013, 14 pages.

*Primary Examiner* — Khai Tran
(74) *Attorney, Agent, or Firm* — Lee, Hong, Degerman, Kang & Waimey

(57) ABSTRACT

The present invention relates to a wireless communication system and, more particularly, to a method and device for compressing and feeding back channel information in a wireless communication system supporting a multi-input multi-output (MIMO) scheme. A method for feeding back channel information by a terminal in a wireless communication system supporting a MINO scheme, according to one embodiment of the present invention, can comprise the steps of: calculating a channel matrix on the basis of a reference signal received from a base station; calculating a first valid channel vector by using a reception weight vector and the channel matrix; and calculating a second valid channel vector by setting a coefficient corresponding to each basis vector included in a basis matrix as 0 if the coefficient is equal to or less than a threshold when the first valid channel vector is factored by the basis matrix.

14 Claims, 10 Drawing Sheets

(56) References Cited

U.S. PATENT DOCUMENTS

| | | | |
|---|---|---|---|
| 2009/0080558 A1* | 3/2009 | An | 375/267 |
| 2009/0268827 A1 | 10/2009 | Clerck et al. | |
| 2011/0200081 A1 | 8/2011 | Guo et al. | |
| 2012/0114064 A1 | 5/2012 | Kotecha et al. | |

* cited by examiner

FIG. 5
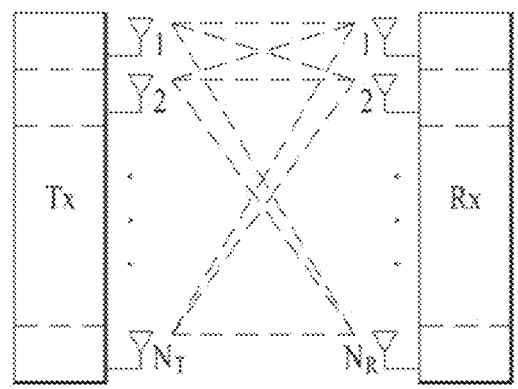
(a)
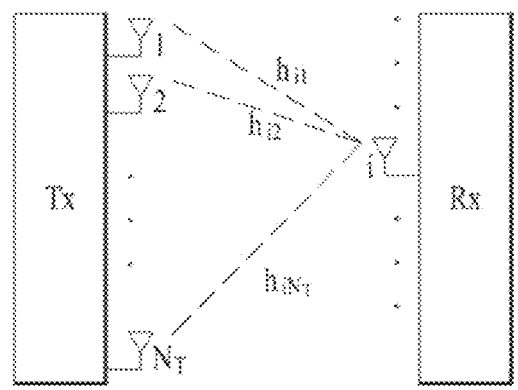
(b)

METHOD AND DEVICE FOR FEEDING BACK CHANNEL INFORMATION IN WIRELESS COMMUNICATION SYSTEM SUPPORTING MULTI-INPUT MULTI-OUTPUT SCHEME

CROSS-REFERENCE TO RELATED APPLICATIONS

This application is the National Stage filing under 35 U.S.C. 371 of International Application No. PCT/KR2012/009588, filed on Nov. 14, 2012, which claims the benefit of U.S. Provisional Application Ser. No. 61/671,799, filed on Jul. 16, 2012, the contents of which are hereby incorporated by reference herein in their entirety.

TECHNICAL FIELD

The present invention relates to a wireless communication system, and more particularly, to a method and apparatus for compressing and feeding back channel information in a wireless communication system for supporting a multi-input multi-output (MIMO) scheme.

BACKGROUND ART

As one of method for increasing data transmission efficiency in a wireless communication system, there is a multi-input multi-output (MIMO) technology. A MIMO scheme can be classified into a single user-MIMO (SU-MIMO) scheme and a multi user-MIMO (MU-MIMO) scheme according to whether data can be simultaneously transmitted using the same band when the data is transmitted to a plurality of users.

A MIMO system can be divided into an open loop mode in which an eNB performs communication without knowing a channel state and a closed loop mode in which an eNB performs communication with reference to channel information fed back from a user equipment (UE). In general, a mainly used scheme is a closed loop scheme for achieving approximate theoretical transmission capacity by applying an independent modulation and coding scheme according to a channel state for each transmission antenna.

In the closed-loop type MIMO system, a UE can use a codebook in order to transmit channel information to an eNB. Codewords included in a codebook indicate different channel states for respective channels between the eNB and the UE. The UE estimates a channel using a reference signal received from the eNB, selects a codeword corresponding to the estimated channel, and then feeds back an index of the codeword to the eNB to notify the eNB of the channel state. When the eNB performs beamforming using each column vector of the codebook as a beamforming vector, the UE calculates the quality of a downlink channel and generates a downlink channel quality indictor. Then the UE feeds back a position of a column vector corresponding to a best downlink channel quality indictor and a downlink channel quality indictor corresponding to the position to the eNB.

For convenience of description, when an $i^{th}$ quantization vector present in a codebook is defined as $q_i$ irrespective of a rank, a quantization vector can be selected according to the following equation.

$$q_k^* = \arg\max_i |H_k q_i| \qquad \text{[Equation 1]}$$

Here, arg max f(x) indicates x for making f(x) with a maximum value. $H_k$ indicates a channel vector of a $k_{th}$ UE. Each UE transmits an optimum quantization vector index via the above procedure.

DISCLOSURE

Technical Problem

An object of the present invention devised to solve the problem lies in a method and apparatus for compressing and feeding back channel information in a wireless communication system for supporting a multi-input multi-output (MIMO) scheme.

Technical Solution

The object of the present invention can be achieved by providing a method for feeding back channel information of a user equipment (UE) in a wireless communication system for supporting a multi-input multi-output (MIMO) scheme, the method including calculating a channel matrix based on a reference signal received from a base station (BS), calculating a first effective channel vector using a reception weight vector and the channel matrix, and calculating a second effective channel vector with 0 as a coefficient corresponding to a basis vector included in the basis matrix when the first effective channel vector is decomposed by the basis matrix if the coefficient is equal to or less than a threshold.

The method may further include calculating a third effective channel vector from the second effective channel vector using a compression matrix having the same number of columns as the number of rows of the basis matrix and a smaller number of rows than the number of rows of the basis matrix.

The threshold may have a greater value than a matrix for a non-correlated channel when the channel matrix is for a correlated channel.

The threshold may be determined such that quantization error of the third effective channel vector is equal to or less than allowable error.

The basis matrix may be selected to include a basis vector with a maximum inner product with the first effective channel vector from a first basis matrix and a second basis matrix.

The first basis matrix and the second basis matrix may be determined such that a matrix distance between the first basis matrix and the second basis matrix is equal to or more than a reference distance.

The basis matrix may be selected as one of the first basis matrix and the second basis matrix via inner product of the first effective channel vector with only some basis vectors included in the first basis matrix and some basis vectors included in the second basis matrix.

A difference between rows and columns of the compression matrix may be determined based on the number of coefficients that are 0.

A difference between rows and columns of the compression matrix may be equal to the number of coefficients that are 0.

A measurement matrix determined via product between the compression matrix and the basis matrix may include one or more unitary matrix.

When the measurement matrix includes a plurality of unitary matrices, the unitary matrices may be determined such that a matrix distance between the unitary matrices is equal to or more than a reference distance.

A measurement matrix determined via product between the compression matrix and the basis matrix may include one unitary matrix and a plurality of measurement vectors, and the measurement vectors may be determined such that a vector distance between the measurement vectors is equal to or more than a reference distance.

In another aspect of the present invention, provided herein is a user equipment (UE) for feeding back channel information in a wireless communication system for supporting a multi-input multi-output (MIMO) scheme, the UE including a radio frequency (RF) unit, and a processor, wherein the processor is configured to calculate a channel matrix based on a reference signal received from a base station (BS), to calculate a first effective channel vector using a reception weight vector and the channel matrix, and to calculate a second effective channel vector with 0 as a coefficient corresponding to a basis vector included in the basis matrix when the first effective channel vector is decomposed by the basis matrix if the coefficient is equal to or less than a threshold.

The processor may be configured to calculate a third effective channel vector from the second effective channel vector using a compression matrix having the same number of columns as the number of rows of the basis matrix and a smaller number of rows than the number of rows of the basis matrix.

It is to be understood that both the foregoing general description and the following detailed description of the present invention are exemplary and explanatory and are intended to provide further explanation of the invention as claimed.

Advantageous Effects

The above embodiments of the present invention can provide a method and apparatus for compressing and feeding back channel information in a wireless communication system for supporting a multi-input multi-output (MIMO) scheme.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 is a diagram illustrating a configuration of a wireless communication system having a multiple antenna;

BEST MODE

Figure 1:
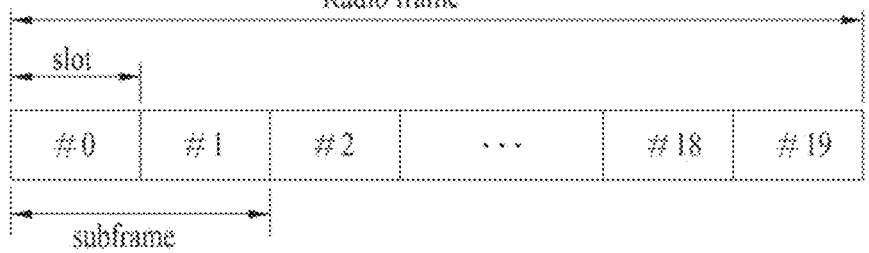
FIG. 1 is a diagram illustrating a configuration of a downlink radio frame.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this specification, embodiments of the present invention are described centering on the data transmission/reception relations between a base station and a user equipment. In this case, the base station has a meaning of a terminal node of a network directly communicating with a user equipment. In this disclosure, a specific operation explained as performed by a base station may be performed by an upper node of the base station in some cases.

In particular, in a network constructed with a plurality of network nodes including a base station, it is apparent that various operations performed for communication with a mobile station can be performed by a base station or other network nodes except the base station. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts in this specification.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX can be explained by IEEE 802.16e standard (wirelessMAN-OFDMA reference system) and evolved IEEE 802.16m standard (wirelessMAN-OFDMA advanced system). For clarity, the following description mainly concerns 3GPP LTE and LTE-A, by which the technical idea of the present invention may be non-limited.

First of all, a structure of a downlink radio frame is described with reference to FIG. 1 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1 is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

The above-described structures of the radio frame are exemplary only. And, the number of subframes included in a radio frame, the number of slots included in the subframe and the number of symbols included in the slot may be modified in various ways.

Figure 2:
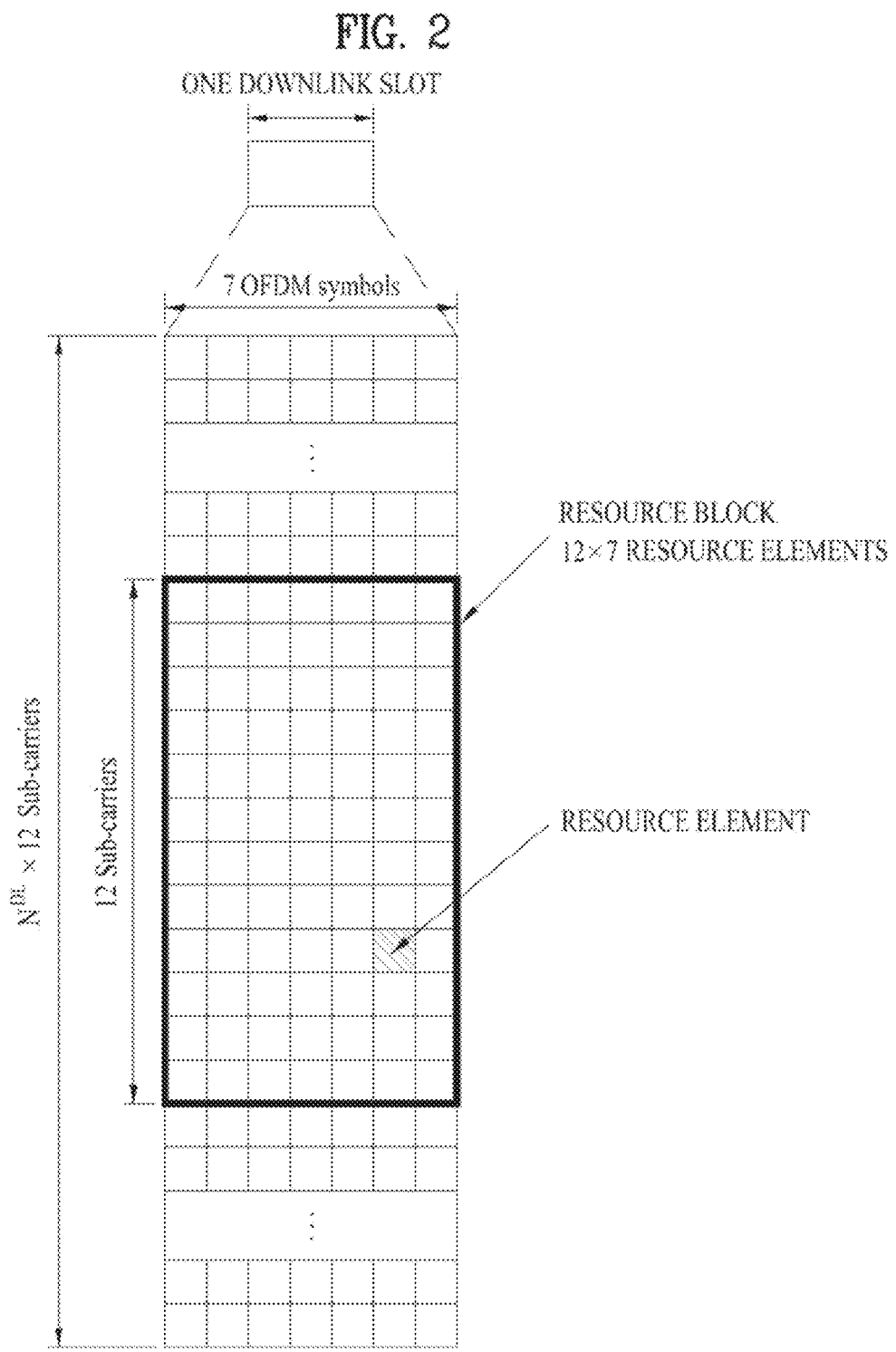
FIG. 2 is a diagram illustrating an example of a resource grid for one downlink slot.

FIG. 2 is a diagram for an example of a resource grid in a downlink slot. The example shows a case that OFDM symbol is configured with a normal CP. Referring to FIG. 2, a downlink slot includes a plurality of OFDM symbols in time domain and includes a plurality of resource blocks in frequency domain. In this case, one downlink slot includes 7 OFDM symbols and one resource block includes 12 subcarriers, by which the present invention may be non-limited. Each element on a resource grid is called a resource element (RE). For instance, a resource element a (k, l) corresponds to a resource element situated on a $k^{th}$ subcarrier and a first OFDM symbol. In case of a normal CP, one resource block includes 12×7 resource elements (in case of an extended CP, 12×6 resource elements). Since a space between subcarriers corresponds to 15 kHz, one resource block includes about 180 kHz in frequency domain. $N^{DL}$ corresponds to the number of resource blocks included in a downlink slot. A value of the $N^{DL}$ can be determined according to a downlink bandwidth configured by a scheduling of a base station.

Figure 3:
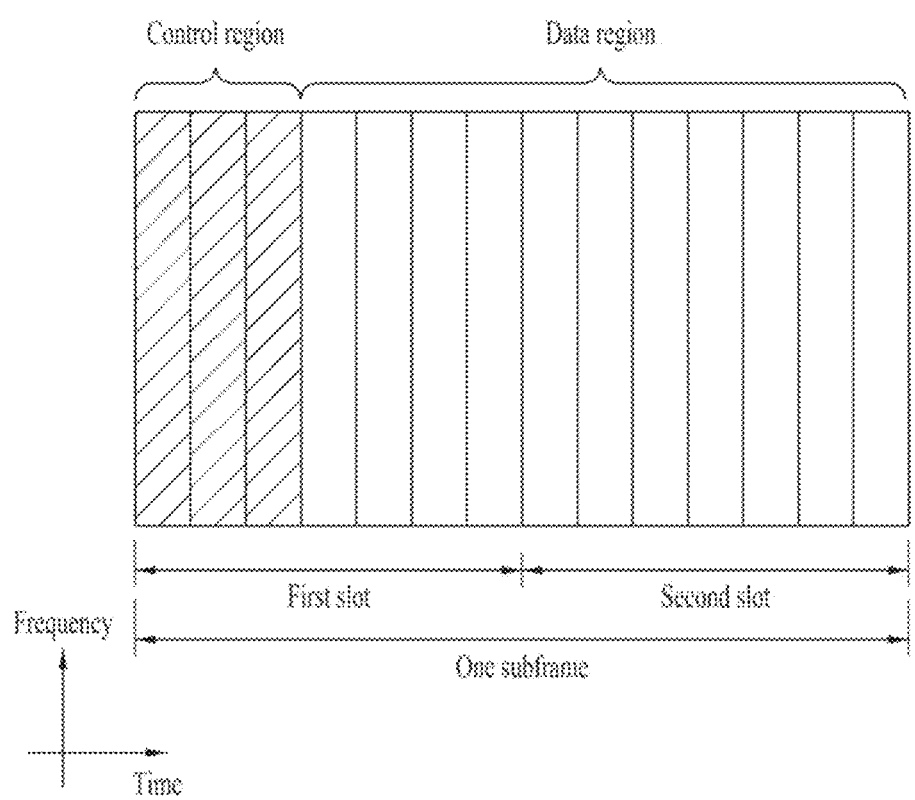
FIG. 3 is a diagram illustrating a configuration of a downlink subframe.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. One subframe corresponds to a basic unit of transmission. In particular, PDCCH and PDSCH are assigned using two slots. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes a HARQ ACK/NACK signal in response to UL transmission. Control information carried on PDCCH may be called downlink control information (hereinafter abbreviated DCI). The DCI may include UL scheduling information, DL scheduling information or a UL transmit power control command for a random UE (user equipment) group. PDCCH is able to carry resource allocation and transmission format of DL-SCH (downlink shared channel), resource allocation information of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 4:
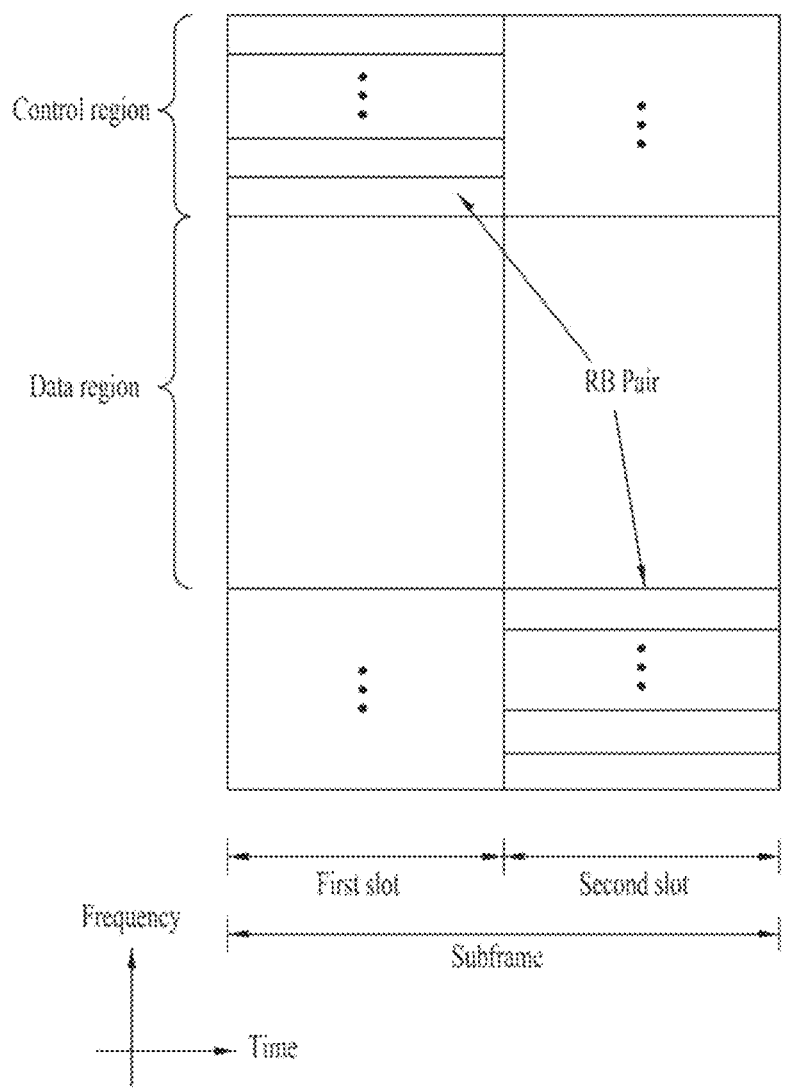
FIG. 4 is a diagram illustrating a configuration of an uplink subframe.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Multiple Input Multiple Output (MIMO) System Modeling

A MIMO (multiple input multiple output) system is a system configured to enhance efficiency of data transmission/reception using multiple transmitting antennas and multiple receiving antennas. A MIMO technology does not depend on a single antenna path to receive a whole message. Instead, the MIMO technology can receive a whole data in a manner of combining a plurality of data fragments received via a plurality of antennas.

The MIMO technology can be classified into a spatial diversity scheme and a spatial multiplexing scheme. The spatial diversity scheme is suitable for a data transmission to a user equipment moving at high speed since the spatial diversity scheme is able to increase transmission reliability or widen a cell radius via a diversity gain. The spatial multiplexing scheme can increase data transfer rate in a manner of simultaneously transmitting data different from each other without increasing system bandwidth.

FIG. 5 is a diagram for a wireless communication system including multiple antennas. As depicted in FIG. 5(a), unlike a case that a plurality of antennas are used in either a transmitter or a receiver only, if the number of transmitting antenna and the number of receiving antenna are increased to $N_T$ and $N_R$, respectively, a theoretical channel transmission capacity is increased in proportional to the number of antenna. Consequently, a transfer rate is enhanced and frequency efficiency is dramatically enhanced. As the channel transmission capacity increases, the transfer rate can be theoretically increased as much as the maximum transfer rate ($R_o$) in case of using a single antenna multiplied by a rate of increase ($R_i$).

$$R_i = \min(N_T, N_R) \quad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

A communication method in the multi-antenna system is explained in more detail using a mathematical modeling. Assume that there exist $N_T$ number of transmitting antenna and $N_R$ number of receiving antenna in the system.

First of all, if we look into a transmission signal, in case that there exists $N_T$ number of transmitting antennas, the maximum number of information capable of being transmitted corresponds to $N_T$. Transmission information can be represented as follows.

$$s = [s_1, s_2, \ldots, s_{N_T}]^T \quad \text{[Formula 2]}$$

Meanwhile, for each of the transmission informations $s_1, s_2, \ldots, s_{N_T}$, a transmit power may vary according to the each of the transmission informations. In this case, if each of the transmit powers is represented as $P_1, P_2, \ldots, P_{N_T}$, transmit power-adjusted transmission information can be represented as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, if $\hat{s}$ is represented using a diagonal matrix P, it can be represented as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vectors $\hat{s}$. In this case, the weighted matrix plays a role in distributing the transmission information to each of the antennas according to the situation of the transmission channel and the like. The transmission signal $x_1, x_2, \ldots, x_{N_T}$ can be represented using a vector X in the following Formula 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Formula 5]}$$

$$W\hat{s} = WPs$$

In this case, $W_{ij}$ means a weighting between an $i^{th}$ transmitting antenna and $j^{th}$ information. The W is called a precoding matrix as well.

Meanwhile, the transmission signal X can be considered with methods different from each other in accordance with two cases (e.g., spatial diversity and spatial multiplexing). In case of the spatial multiplexing, different signals are multiplexed and a multiplexed signal is transmitted to a receiving end. Hence, an element of information vector(s) may have values different from each other. Meanwhile, in case of the spatial diversity, since an identical signal is repeatedly transmitted via a plurality of channel paths, the element of the information vector(s) may have an identical value. Of course, it is also able to consider a combination of the spatial diversity scheme and the spatial multiplexing scheme. In particular, for instance, an identical signal is transmitted via 3 transmitting antennas in accordance with the spatial diversity scheme and the rest of signals can be transmitted to the receiving end in a manner of being spatial multiplexed.

If there exists $N_R$ number of receiving antenna, a reception signal for each antenna can be represented as a vector in the following Formula 6.

$$y = [y_1, y_2, \ldots, y_{N_R}]^T \quad \text{[Formula 6]}$$

In case of modeling a channel in a multi-antenna wireless communication system, the channel can be distinguished by a transmitting and receiving antenna index. The channel passing through a transmitting antenna j to receiving antenna i is represented as $h_{ij}$. According to the $h_{ij}$, it should be cautious that a receiving antenna index comes first and a transmitting antenna index comes later.

Meanwhile, FIG. 5 (b) is a diagram of channels passing through from $N_T$ number of transmitting antennas to the receiving antenna i. The channels can be represented as a vector and a matrix form in a manner of being collected. According to FIG. 5 (b), a channel starting from the total $N_T$ number of transmitting antennas and arriving at the receiving antenna i can be represented as follows.

$$h_i^T = [h_{i1}, h_{i2}, \ldots, h_{iN_T}] \quad \text{[Formula 7]}$$

Hence, all channels starting from the $N_T$ number of transmitting antennas and arriving at the $N_R$ number of receiving antennas can be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Formula 8]}$$

Practically, after passing through the channel matrix H, an Additive White Gaussian Noise (AWGN) is added to the channel. The Additive White Gaussian Noise (AWGN) added to the each of the $N_R$ number of receiving antennas can be represented as follows.

$$n = [n_1, n_2, \ldots, n_{N_R}]^T \quad \text{[Formula 9]}$$

According to the aforementioned mathematical modeling, a reception signal can be represented as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Formula 10]}$$

Numbers of column and row of the channel matrix H, which indicates a state of a channel, is determined by the number of transmitting/receiving antenna. In the channel matrix H, the number of row corresponds to the number of receiving antennas $N_R$ and the number of column corresponds to the number of transmitting antennas $N_T$. In particular, the channel matrix H corresponds to a matrix of $N_R \times N_T$.

Since a rank of the channel matrix is defined by a minimum number of the numbers of row or column independent from each other, the rank of the matrix is configured not to be greater than the number of the row or the column. The rank rank(H) of the channel matrix H is restricted as follows.

$$\text{rank}(H) \leq \min(N_T, N_R) \quad \text{[Formula 11]}$$

In performing MIMO transmission, 'rank' indicates the number of paths capable of independently transmitting a signal and 'the number of layers' indicates the number of signal streams transmitted via each of the paths. In general, since a transmitting end transmits layers corresponding to the number of ranks, a rank may have a same meaning with the number of layer unless there is a specific citation.

Reference Signal (RS)

When a packet is transmitted in a wireless communication system, since the packet is transmitted via a radio channel, a signal may be distorted in the course of transmission. In order for a receiving end to correctly receive a distorted signal, it may be preferable that the distorted and received signal is corrected using channel information. In order to find out the channel information, a signal known to both of a transmitting end and the receiving end is transmitted and finds out the channel information with the extent of distortion when the signal is received on a channel. The signal is called a pilot signal or a reference signal.

When a data is transmitted/received using MIMO antenna, it may be preferable that a channel state between a transmitting antenna and a receiving antenna is detected in order for a receiving end to correctly receive the data. Hence, in order for the receiving end to detect the channel state, each transmitting antenna of the transmitting end may preferably have an individual reference signal.

In a mobile communication system, a reference signal (RS) is mainly classified into two types in accordance with a purpose of the RS. One type of the RS is used to obtain channel information and another type of the RS is used to demodulate data. Since the former one is the RS to make a UE obtain DL channel information, it is transmitted in wideband. Although a UE does not receive DL data in a specific subframe, the UE should receive and measure the corresponding RS. This sort of RS can also be used for performing a measurement for a handover and the like. In case that a base station transmits a resource in DL, the latter one corresponds to an RS transmitted together with the resource. A UE can perform channel estimation by receiving the RS and may be then able to demodulate data. This sort of RS should be transmitted to a region to which the data is transmitted.

A legacy 3GPP LTE (e.g., 3GPP LTE release-8) system defines two types of downlink RS for a unicast service. One is a common RS (CRS) and another is a dedicated RS (DRS). The CRS is used to obtain information on a channel state and perform a measurement for a handover and the like. The CRS is also called a cell-specific RS. The DRS is used to demodulate data and may be named a UE-specific RS. In the legacy 3GPP LTE system, the DRS is only used for the use of data demodulation and the CRS can be used for two purposes, i.e., obtaining channel information and performing data demodulation.

The CRS is a cell-specifically transmitted RS and transmitted in every subframe for a wideband. The CRS for maximum 4 antenna ports can be transmitted according to the number of transmitting antennas of a base station. For instance, if the number of antenna ports of the base station corresponds to 2, a CRS for $0^{th}$ antenna port and a CRS for $1^{st}$ antenna port are transmitted. If the number of antenna ports of the base station corresponds to 4, CRSs for 0 to $3^{rd}$ antenna port are transmitted, respectively.

Figure 6:
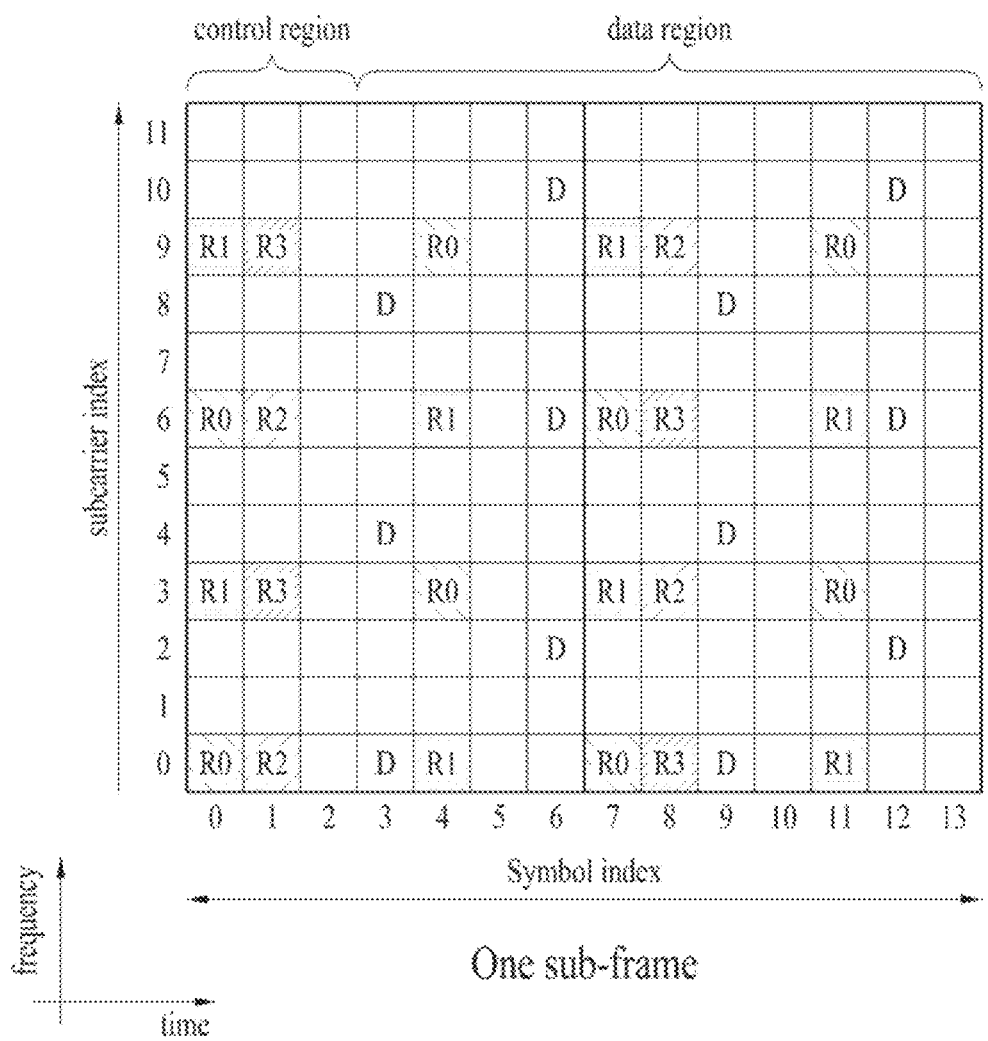
FIG. 6 is a diagram illustrating patterns of legacy CRS and DRS.

FIG. 6 is a diagram for a pattern of a CRS and a DRS on one resource block (in case of a normal CP, 14 OFDM symbols in time domain×12 subcarriers in frequency domain) in a system supporting 4 transmitting antennas. In FIG. 6, resource elements (RE) represented as 'R0', 'R2', and 'R3' indicate a position of the CRS for an antenna port 0, 1, 2, and 3, respectively. Meanwhile, a resource element represented as 'D' in FIG. 6 indicates a position of the DRS defined in LTE system.

In LTE-A system, which is an evolved version of LTE system, maximum 8 transmitting antennas can be supported in DL. Hence, it is also necessary to support RS for the maximum 8 transmitting antennas. Since a downlink RS is defined for maximum 4 antenna ports only in LTE system, if a base station includes more than 4 and maximum 8 DL transmitting antennas in LTE-A system, it is necessary to additionally define RS for the antenna ports. As the RS for the maximum 8 transmitting antenna ports, it should consider both the RS for channel estimation and the RS for data demodulation.

One of the important considerations in designing LTE-A system is backward compatibility. The backward compatibility means to support a legacy LTE UE to properly operate in LTE-A system. In terms of a transmission of an RS, if the RS for the maximum 8 transmitting antenna ports is added to time-frequency domain where a CRC defined in LTE standard is transmitted to whole band in every subframe, RS overhead becomes considerably big. Hence, in case of newly designing the RS for the maximum 8 antenna ports, it should consider the RS overhead.

A newly introduced RS in LTE-A system can be mainly classified into two types. One is a channel state information RS (CSI-RS) used for a purpose of channel measurement to select a transmission rank, modulation and coding scheme (MCS), precoding matrix index (PMI) and the like. Another one is a demodulation RS (DM RS) used for a purpose of demodulating data transmitted via the maximum 8 transmitting antennas.

Unlike the CRS in the legacy LTE system used for the purpose of demodulating data as well as measuring a channel, handover, and the like, the CSI-RS used for the purpose of channel measurement is designed for the purpose of mainly measuring a channel. Of course, the CSI-RS can also be used for the purpose of measuring handover and the like. Unlike the CRS in the legacy LTE system, since the CSI-RS is transmitted to obtain information on a channel state only, it is not necessary to transmit the CSI-RS in every subframe. Hence, it is able to design the CSI-RS to be intermittently (e.g., periodically) transmitted in time axis to reduce overhead of the CSI-RS.

In case of transmitting data in a prescribed DL subframe, DM RS is dedicatedly transmitted to a UE in which data transmission is scheduled. A specific UE-dedicated DM RS can be designed to be transmitted to a resource region in which the UE is scheduled, i.e., time-frequency domain to which data on the UE is transmitted only.

Figure 7:
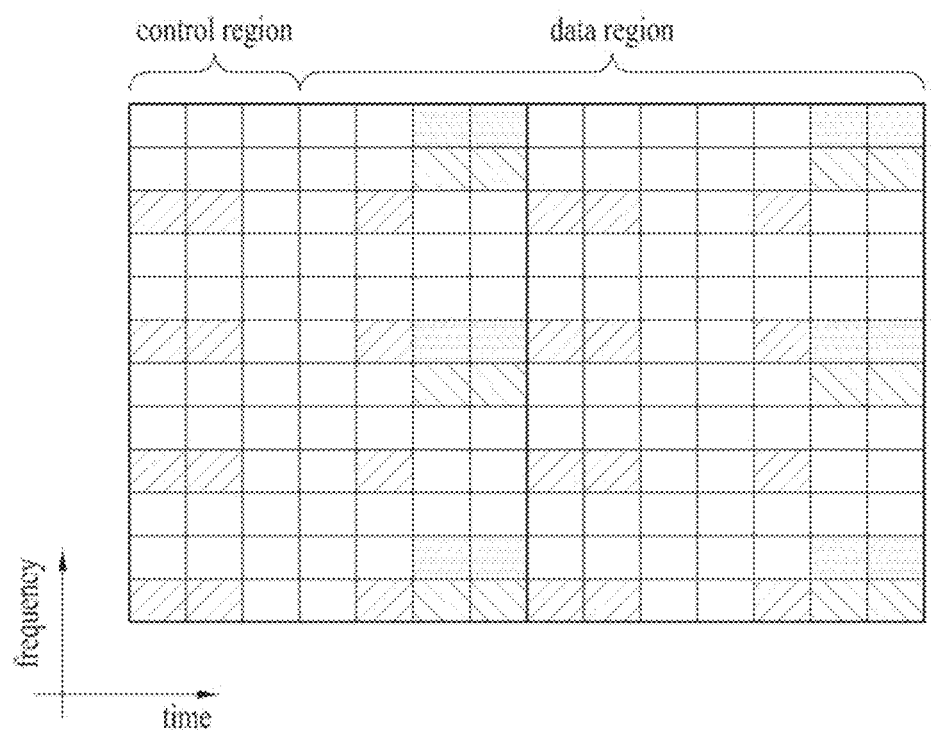
FIG. 7 is a diagram illustrating an example of a DM RS pattern.

FIG. 7 is a diagram for an example of a DM RS pattern defined in LTE-A system. FIG. 7 shows a position of a resource element to which a DM RS is transmitted on one resource block (in case of a normal CP, 14 OFDM symbols in time domain×12 subcarriers in frequency domain) in which DL data is transmitted. The DM RS can be transmitted in response to 4 antenna ports (antenna port index 7, 8, 9, and 10) additionally defined in LTE-A system. The DM RS for antenna ports different from each other can be distinguished from each other in a manner of being positioned at frequency resources (subcarriers) different from each other and/or time resources (OFDM symbols) different from each other (i.e., the DM RS for antenna ports different from each other can be multiplexed by FDM and/or TDM scheme). And, the DM RS for antenna ports different from each other positioned at an identical time-frequency resource can be distinguished from each other by an orthogonal code (i.e., the DM RS for antenna ports different from each other can be multiplexed by CDM scheme). Referring to the example of FIG. 7, DM RSs for an antenna port 7 and 8 can be positioned at resource elements (REs) represented as a DM RS CDM group 1 and the DM RSs for the antenna port 7 and 8 can be multiplexed by the orthogonal code. Similarly, referring to the example of FIG. 7, DM RSs for an antenna port 9 and 10 can be positioned at resource elements (REs) represented as a DM RS CDM group 2 and the DM RSs for the antenna port 9 and 10 can be multiplexed by the orthogonal code.

Figure 8:
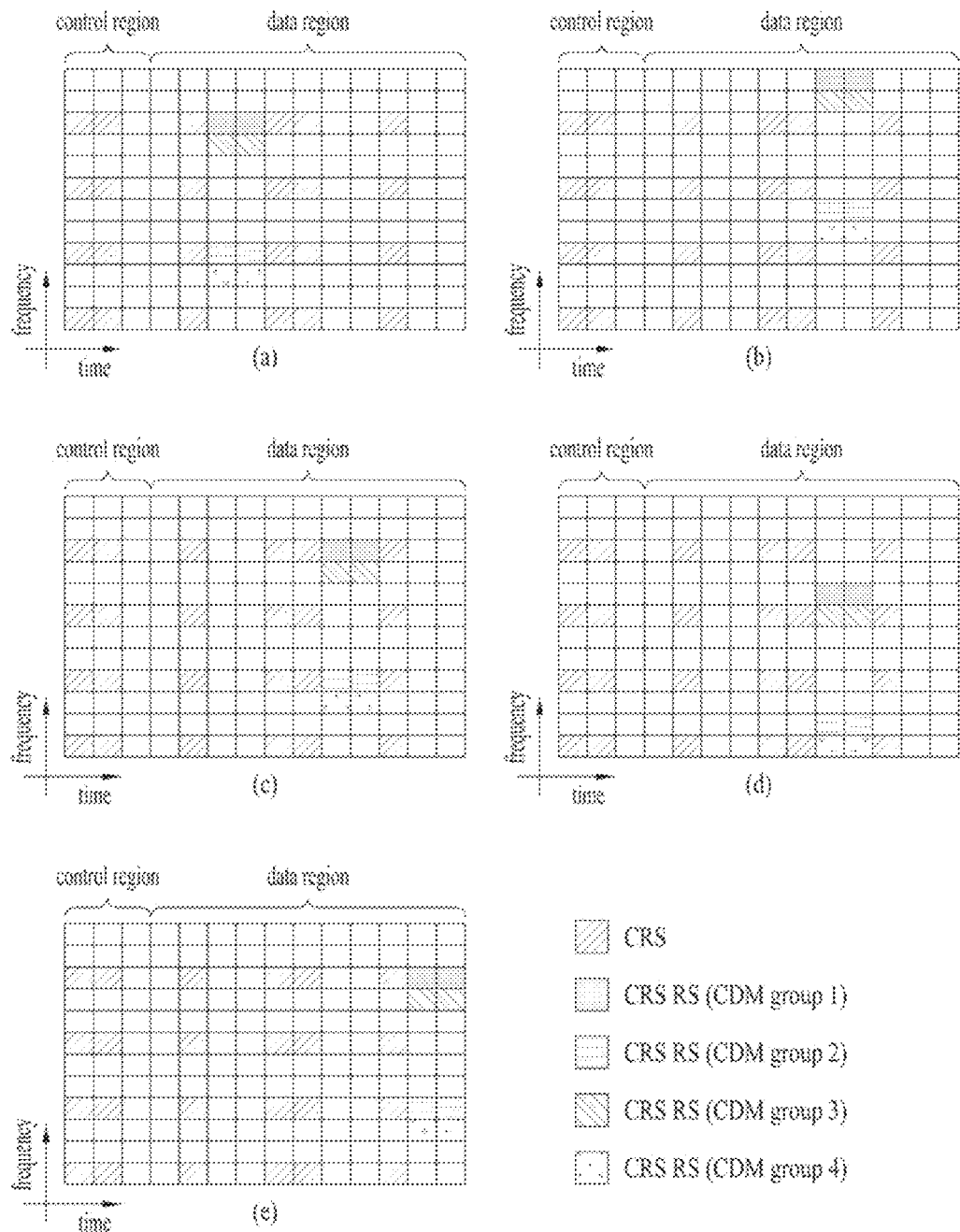
FIG. 8 is a diagram illustrating an example of a CSI-RS pattern.

FIG. 8 is a diagram for examples of a CSI-RS pattern defined in LTE-A system. FIG. 8 shows a position of a resource element to which a CSI-RS is transmitted on one resource block (in case of a normal CP, 14 OFDM symbols in time domain×12 subcarriers in frequency domain) in which DL data is transmitted. One CSI-RS pattern among patterns depicted in FIG. 8 (a) to FIG. 8 (e) can be used in a prescribed DL subframe. The CSI-RS can be transmitted in response to 8 antenna ports (antenna port index 15, 16, 17, 18, 19, 20, 21 and 22) additionally defined in LTE-A system. The CSI-RS for antenna ports different from each other can be distinguished from each other in a manner of being positioned at frequency resources (subcarriers) different from each other and/or time resources (OFDM symbols) different from each other (i.e., the CSI-RS for antenna ports different from each other can be multiplexed by FDM and/or TDM scheme). And, the CSI-RS for antenna ports different from each other positioned at an identical time-frequency resource can be distinguished from each other by an orthogonal code (i.e., the CSI-RS for antenna ports different from each other can be multiplexed by CDM scheme). Referring to the example of FIG. 8 (a), CSI-RSs for an antenna port 15 and 16 can be positioned at resource elements (REs) represented as a CSI-RS CDM group 1 and the CSI-RSs for the antenna port 15 and 16 can be multiplexed by the orthogonal code. Referring to the example of FIG. 8 (a), CSI-RSs for an antenna port 17 and 18 can be positioned at resource elements (REs) represented as a CSI-RS CDM group 2 and the CSI-RSs for the antenna port 17 and 18 can be multiplexed by the orthogonal code. Referring to the example of FIG. 8 (a), CSI-RSs for an antenna port 19 and 20 can be positioned at resource elements (REs) represented as a CSI-RS CDM group 3 and the CSI-RSs for the antenna port 19 and 20 can be multiplexed by the orthogonal code. Referring to the example of FIG. 8 (a), CSI-RSs for an antenna port 21 and 22 can be positioned at resource elements (REs) represented as a CSI-RS CDM group 4 and the CSI-RSs for the antenna port 21 and 22 can be multiplexed by the orthogonal code. A principle explained on the basis of FIG. 8 (a) can be identically applied to FIG. 8 (b) to FIG. 8 (e).

The RS patterns depicted in FIG. 6 to FIG. 8 are just examples. Various examples of the present invention may be non-limited to a specific RS pattern. In particular, in case of using an RS pattern different from the RS patterns depicted in FIG. 6 to FIG. 8, various embodiments of the present invention can also be identically applied to the RS pattern.

CSI-RS Configuration

As described above, in an LTE-A system for supporting a maximum of eight transmission antennas, an eNB needs to transmit a CSI-RS for all antenna ports. When a CSI-RS for a maximum of eight transmission antenna ports is transmitted at each subframe, it is very disadvantageous, very high overhead may be generated. Accordingly, when a CSI-RS is not transmitted at each subframe and is intermittently transmitted in the time axis, overhead may be reduced. Thus, the CSI-RS may be periodically transmitted with a period of an integer time of one subframe or may be transmitted with specific transmission pattern.

In this case, a period or pattern for transmission of the CSI-RS may be configured by an eNB. In order to measure the CSI-RS, a UE needs to know CSI-RS configuration for each CSI-RS antenna port of a cell to which the UE belongs. The CSI-RS configuration may include a downlink subframe index for transmission of a CSI-RS, a time-frequency position (e.g. CSI-RS pattern illustrated in FIGS. 8(a) to 8(e)) of a CSI-RS resource element (RE) in a transmission subframe, and a CSI-RS sequence (which is a sequence used for a CSI-RS and is pseudo-randomly generated according a predetermined rule based on a slot number, a cell ID, a CP length, etc.). That is, a given eNB may use a plurality of CSI-RS configurations and notify UE(s) in a cell of a CSI-RS configuration to be used among a plurality of CSI-RS configurations.

In addition, since CSI-RSs for respective antenna ports need to be differentiated, resources for transmission of the CSI-RSs for the respective antenna ports need to be orthogonal to each other. As described with reference to FIG. 8, the CSI-RSs for the respective antenna ports may be multiplexed via a FDM, TDM, and/or CDM method using orthogonal frequency resources, orthogonal time resources, and/or orthogonal code resources.

In order to notify UEs in a cell of CSI-RS information (CSI-RS configuration), an eNB needs to notify the UEs of information about time-frequency to which the CSI-RSs for the respective antenna ports are mapped. In detail, information about time may include the number of subframes for transmission of a CSI-RSs, a period for transmission of a CSI-RS, a subframe offset for transmission of a CSI-RS, an OFDM symbol number for transmission of a CSI-RS resource element (RE) of a specific antenna, etc. Information about frequency may include frequency spacing for transmission of a CSI-RS resource element (RE) of a specific antenna, offset or shift value of an RE in the frequency axis, etc.

Configuration for CSI-RS transmission may be configured in various ways, and an eNB needs to notify a UE of CSI-RS configuration such that the UE appropriately receives CSI-RS and performs channel measurement.

Feedback Information Compressing Method in MIMO System

As described above, a MIMO system may increase the number of antennas, thereby increasing transmission capacity. In particular, the case in which one eNB uses a massive number of antennas may be referred to as massive MIMO. However, in a massive MIMO system, feedback information of channel increases with the number of antennas. In this case, when a feedback method based on a codebook is used, a problem may arise in that throughput is excessively increased. In detail, the number of antennas increases with the size of a codebook, and thus computational load and required memory capacity are increased. Accordingly, there is a need for a method for compressing and transmitting feedback information about a channel without using a codebook.

In the feedback method according to the present invention, information about a channel matrix is compressed, quantized, and then fed back. For example, when an eNB uses 100 antennas, information about the channel matrix includes information about each of the 100 antennas. In this case, when the information about the channel matrix is compressed (e.g., compressed so as to only information about 50 antennas or less) and then quantized, the amount of feedback information may be effectively reduced.

Hereinafter, for convenience of description, a feedback method when beamforming is performed based on a singular value decomposition (SVD) method in a 1:1 communication environment of an eNB and a UE will be described, but the present invention is not limited to the feedback method and can be applied to the case in which the eNB communicate with a plurality of UEs or another type of beamforming is performed.

Figure 9:
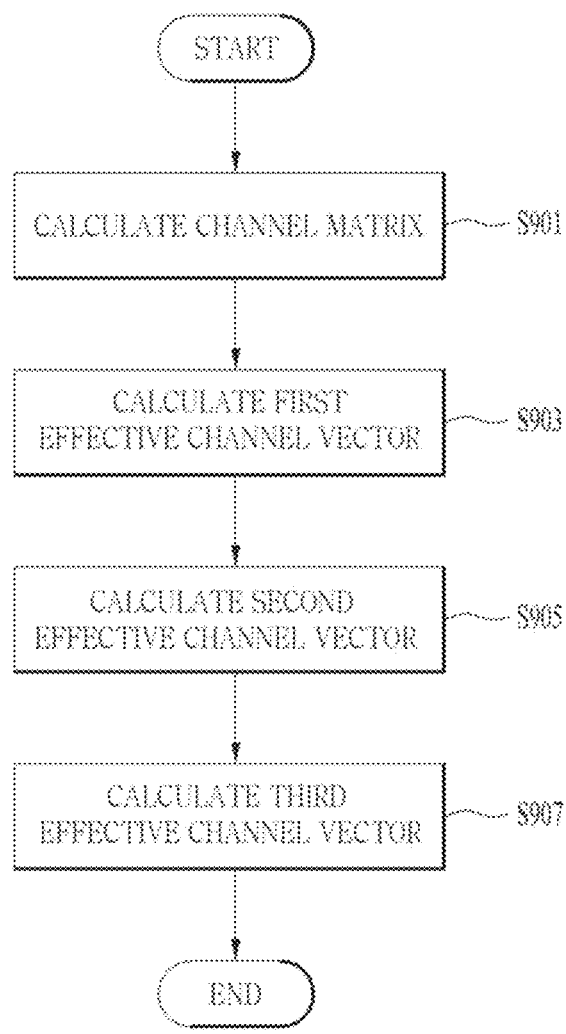
FIG. 9 is a flowchart of an example of a feedback method according to the present invention.

FIG. 9 is a flowchart of an example of a feedback method according to the present invention.

Referring to FIG. 9, first, a UE calculates a channel matrix based on a reference signal included in a signal received from an eNB (S901). The reference signal and channel estimation have been described and thus a detailed description thereof will be omitted here.

Then the UE calculates a first effective channel vector using a reception weight vector and the channel matrix (S903). When the SVD method is used, channel matrix Hk for a kth UE can be decomposed as follows.

$$H_k = U_k S_k V_k^H \qquad \text{[Equation 14]}$$

Matrices $U_k$ and $V_k$ are orthogonal to each other, and $S_k$ is a diagonal matrix including singular values. In the SVD method, the UE uses $u_1^H$ as a reception weight vector, and $u_1^H$ is Hermitian form of left singular vector corresponding to a highest singular value. Accordingly, the first effective channel vector is $v_1^k$ vector corresponding to a highest singular value in matrix $V_k$. The first effective channel vector $v_1^k$ is a vector with dimension corresponding to the number of antennas of the eNB.

Then, when the first effective channel vector is decomposed by a basis matrix, if a coefficient corresponding to each basis vector included in the basis matrix is equal to or less than a threshold, the UE calculates a second effective channel vector with the coefficient of 0 (S905).

The $M^{th}$-dimensional first effective channel vector may be decomposed by a M×M basis matrix. In this case, the M×M basis matrix may be generated via a method of a discrete Fourier transform (DFT) matrix as a unitary matrix. The decomposed $M^{th}$-dimensional first effective channel vector $v_1$ may be represented as follows.

$$v_1 = \alpha_1 b_1 + \ldots + \alpha_M b_M \qquad \text{[Equation 15]}$$

Here, b is a basis vector included in a basis matrix B. α is a coefficient corresponding to each basis vector.

The UE may decompose the first effective channel vector as described above and then calculate the second effective channel vector using 0 as a threshold $\alpha_{th}$ or less among coefficients α. This method may be referred to as sparse approximation.

In this case, the UE may adjust a threshold to adjust a compression degree of feedback information. For example, when threshold is increased, more coefficients become 0, thereby increasing the compressibility of feedback information. However, when the threshold is increased, it may be disadvantageous in that quantization errors of the feedback information occur more frequently. Accordingly, the threshold may be determined using the following method.

First, when the channel matrix corresponds to a correlated channel, a greater threshold may be configured than the case in which the channel matrix corresponds to a non-correlated channel. In the case of the correlated channel, in general, a channel is inclined in one direction, and thus quantization errors may not be relatively high even if the threshold is increased. However, in the case of the non-correlated channel, in general, a channel is distributed in various directions, and thus a smaller threshold may be configured than in the case of the correlated channel.

In addition, the UE may determine a reference (allowable error) for allowable quantization error based on an environment of the UE, etc. and configure a threshold such that the quantization error is lower than the allowable error. That is, the UE may set the threshold so as to increase compressibility if possible as long as required quality of service (QOS) is ensured.

The UE may perform operation S905 using one basis matrix selected from a plurality of basis matrices. When a basis matrix including a basis vector having a large inner product value with the first effective channel vector is selected from the basis matrices, compressibility can be increased.

For example, when a first basis matrix and a second basis matrix are present, the UE may calculate an inner product value between the first effective channel vector and basis vectors included in the first basis matrix, calculate an inner product value between the first effective channel vector and basis vectors included in the second basis matrix, and then select a basis matrix including a basis vector with a maximum inner product value so as to perform operation S905.

When a plurality of basis matrices may be determined such that a matrix distance between the basis matrices is equal to or more than a reference distance, and the UE may select one basis matrix from the basis matrices so as to perform operation S905. In this case, higher compressibility may be achieved than in the case in which one basis matrix is selected from a plurality of basis matrices that do not consider a matrix distance.

In addition, during selection of one basis matrix from a plurality of basis matrices, the UE may not compare all basis vectors included in the basis matrix with the first effective channel vector and may compare only some vectors included in the basis matrix with the first effective channel vector so as to select one basis matrix. In this case, during selection of a basis matrix, computational load and required memory capacity can be reduced.

A second effective channel vector $\tilde{v}_1$ calculated via operation S905 may be represented as follows.

$$\tilde{v}_1 = Bz \quad \text{[Equation 16]}$$

Here, B is a basis matrix and z is a vector including 0 or coefficients α that is not 0.

That is, an element corresponding to a coefficient 0 is removed from the second effective channel vector, but a vector size is not reduced. Thus, the vector size may be reduced via operation S907 below.

Then the UE may calculate a third effective channel vector from the second effective channel vector using a compression matrix having the same number of columns as the number of rows of a basis matrix and a smaller number of rows than the number of rows of the basis matrix (S907). That is, a relationship between the second effective channel vector and a third effective channel vector $\hat{v}_1$ may be represented as follows.

$$\hat{v}_1 = CBz \quad \text{[Equation 17]}$$

Here, C is a compression matrix. In addition, the number of rows of the compression matrix may be referred to as a compression level c.

That is, the compression matrix C is a c×M matrix and the basis matrix B is M×M matrix, and thus the size of the third effective channel vector may be determined according to a compression level. In order to minimize compression error, a compression level may be configured to be more than the number (sparse level) of coefficient that is not 0. Preferably, the compression level may have the same as the sparse level. In addition, Since quantization error and compression error are affected by the sparse level and the compression level, the UE may appropriately determine the sparse level and the compression level according to a channel situation using a table showing the accuracy of feedback information based on value of the sparse level and compression level.

In Equation 17, product of the compression matrix C and the basis matrix B may be referred to as a measurement matrix. In order to increase compressibility in a vector space, the measurement matrix may include mutually unbiased bases (MUB). However, a problem occurs in that the MUB is not applied to all sizes of matrices. Accordingly, the measurement matrix may be determined using the following method.

First, the measurement matrix may be determined to include a plurality of random unitary matrices. The unitary matrix refers to a matrix with vectors orthogonal to each other. That is, only the orthogonality between vectors included in the unitary matrix is considered without considering a matrix distance between a plurality of unitary matrices. In this case, information about a plurality of random unitary matrices may be shared by a UE and an eNB.

The measurement matrix may be determined to include only unitary matrices with a matrix distance that is equal to or more than a reference distance. When the measurement matrix includes a unitary matrix that considers a matrix distance, higher compressibility may be achieved than a measurement matrix including the random unitary matrix.

In addition, the measurement matrix includes one unitary matrix and a plurality of measurement vectors, and the measurement vectors may be determined to have a vector distance between the measurement vectors, which is equal to or more than a reference distance.

Figure 10:
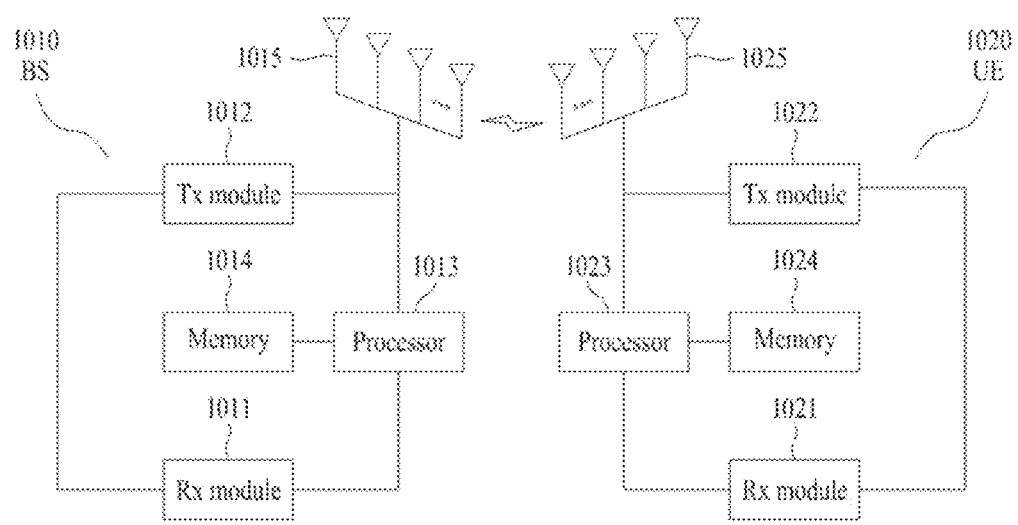
FIG. 10 is a diagram illustrating an eNB and a user equipment (UE) to which an embodiment of the present invention is applicable.

FIG. 10 is a diagram illustrating an eNB 1010 and a UE 1020 to which an embodiment of the present invention is applicable.

Referring to FIG. 10, the UE 1020 according to the present invention may include a receiving module 1021, a transmitting module 1022, a processor 1023, a memory 1024, and a plurality of antennas 1025. The antennas 1025 refer to a UE for supporting MIMO transmission and reception. The receiving module 1021 may receive various signals, data, and information in downlink from the eNB 1010. The transmitting module 1022 may transmit various signals, data, and information in uplink to the eNB 1010. The processor 1023 may be configured to embody procedures and/or methods proposed according to the present invention. The memory 1024 may store calculated and processed information, etc. for a predetermined period of time and may be replaced with a component such as a buffer (not shown), etc.

The eNB 1010 may include a receiving module 1011, a transmitting module 1012, a processor 1013, a memory 1014, and a plurality of antennas 1015. The antennas 1015 refer to an eNB for supporting MIMO transmission and reception. The receiving module 1011 may receive various signals, data, and information in uplink from the UE 1020. The transmitting module 1012 may transmit various signals, data, and information in downlink to the UE 1020. The processor 1013 may be configured to embody procedures and/or methods proposed according to the present invention. The memory 1014 may store calculated and processed information, etc. for a predetermined period of time and may be replaced with a component such as a buffer (not shown), etc.

Detailed component of the above eNB and UE may be embodied so as to independently apply the above description of various embodiments of the present invention or to simultaneously apply two or more embodiments, and repeated description thereof will be omitted for clarity.

In addition, the description of the eNB 1010 described with reference to FIG. 10 may also be applied to a relay apparatus as a downlink transmitter or an uplink receiver, and the description of the UE 1020 may also be applied to a relay apparatus as a downlink receiver or an uplink transmitter.

The embodiments of the present invention may be achieved by various means, for example, hardware, firmware, software, or a combination thereof.

In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

The invention claimed is:

1. A method for feeding back channel information of a user equipment (UE) in a wireless communication system for supporting a multi-input multi-output (MIMO) scheme, the method comprising:
    calculating a channel matrix based on a reference signal received from a base station (BS);
    calculating a first effective channel vector using a reception weight vector and the channel matrix; and
    calculating a second effective channel vector with 0 as a coefficient corresponding to a basis vector included in the basis matrix when the first effective channel vector is decomposed by the basis matrix if the coefficient is equal to or less than a threshold.

2. The method of claim 1, further comprising calculating a third effective channel vector from the second effective channel vector using a compression matrix having the same number of columns as the number of rows of the basis matrix and a smaller number of rows than the number of rows of the basis matrix.

3. The method of claim 1, wherein the threshold has a greater value than a matrix for a non-correlated channel when the channel matrix is for a correlated channel.

4. The method of claim 2, wherein the threshold is determined such that quantization error of the third effective channel vector is equal to or less than allowable error.

5. The method of claim 1, wherein the basis matrix is selected to include a basis vector with a maximum inner product with the first effective channel vector from a first basis matrix and a second basis matrix.

6. The method of claim 5, wherein the first basis matrix and the second basis matrix are determined such that a matrix distance between the first basis matrix and the second basis matrix is equal to or more than a reference distance.

7. The method of claim 5, wherein the basis matrix is selected as one of the first basis matrix and the second basis matrix via inner product of the first effective channel vector with only some basis vectors included in the first basis matrix and some basis vectors included in the second basis matrix.

8. The method of claim 2, wherein a difference between rows and columns of the compression matrix is determined based on the number of coefficients that are 0.

9. The method of claim 2, wherein a difference between rows and columns of the compression matrix is equal to the number of coefficients that are 0.

10. The method of claim 2, wherein a measurement matrix determined via product between the compression matrix and the basis matrix comprises one or more unitary matrix.

11. The method of claim 10, wherein, when the measurement matrix comprises a plurality of unitary matrices, the unitary matrices are determined such that a matrix distance between the unitary matrices is equal to or more than a reference distance.

12. The method of claim 2, wherein:
a measurement matrix determined via product between the compression matrix and the basis matrix comprises one unitary matrix and a plurality of measurement vectors; and
the measurement vectors are determined such that a vector distance between the measurement vectors is equal to or more than a reference distance.

13. A user equipment (UE) for feeding back channel information in a wireless communication system for supporting a multi-input multi-output (MIMO) scheme, the UE comprising:
a radio frequency (RF) unit; and
a processor,
wherein the processor is configured to calculate a channel matrix based on a reference signal received from a base station (BS), to calculate a first effective channel vector using a reception weight vector and the channel matrix, and to calculate a second effective channel vector with 0 as a coefficient corresponding to a basis vector included in the basis matrix when the first effective channel vector is decomposed by the basis matrix if the coefficient is equal to or less than a threshold.

14. The UE of claim 13, wherein the processor is configured to calculate a third effective channel vector from the second effective channel vector using a compression matrix having the same number of columns as the number of rows of the basis matrix and a smaller number of rows than the number of rows of the basis matrix.

\* \* \* \* \*